United States Patent [19]

Nakamura et al.

[11] Patent Number: 5,725,702
[45] Date of Patent: Mar. 10, 1998

[54] HEAVY DUTY PNEUMATIC RADIAL TIRES WITH DEFORMATION-ABSORBING RUBBER LAYER COVERING TURNUP PORTION OUTER SURFACE

[75] Inventors: Hiroshi Nakamura; Hiroyuki Iida; Makoto Tsuruta, all of Kadaira, Japan

[73] Assignee: Bridgestone Corporation, Tokyo, Japan

[21] Appl. No.: 628,237

[22] Filed: Apr. 4, 1996

[30] Foreign Application Priority Data

| Apr. 5, 1995 | [JP] | Japan | 7-079996 |
| May 30, 1995 | [JP] | Japan | 7-131948 |
| Mar. 22, 1996 | [JP] | Japan | 8-066543 |

[51] Int. Cl.$^6$ .............. B60C 15/00; B60C 15/06
[52] U.S. Cl. .............. 152/541; 152/539; 152/543; 152/547
[58] Field of Search .............. 152/539, 541, 152/543, 547, 552, 564

[56] References Cited

U.S. PATENT DOCUMENTS

| 3,964,533 | 6/1976 | Arimura et al. | 152/541 |
| 4,185,677 | 1/1980 | Motomura et al. | 152/541 |
| 4,215,737 | 8/1980 | Motomura et al. | 152/541 |
| 4,227,563 | 10/1980 | Grosch et al. | 152/541 X |
| 4,319,621 | 3/1982 | Motomura et al. | 152/541 X |
| 5,056,575 | 10/1991 | Yamaguchi et al. | |

FOREIGN PATENT DOCUMENTS

| 0458633 | 11/1991 | European Pat. Off. | |
| 59-118510 | 7/1984 | Japan | 152/539 |
| 4-27606 | 1/1992 | Japan | |
| 5-16618 | 1/1993 | Japan | |
| 5319035 | 12/1993 | Japan | 152/539 |

Primary Examiner—Adrienne C. Johnstone
Attorney, Agent, or Firm—Sughrue, Mion, Zinn, Macpeak & Seas, PLLC

[57] ABSTRACT

A heavy duty pneumatic radial tire comprises a tread portion, a pair of sidewall portions, a pair of bead portions containing a pair of bead cores therein, at least one radial carcass ply, and a bead filler comprised of at least two rubber stocks, in which at least a part of an outer surface of a turnup portion of the carcass ply in axial direction of the tire is covered with a deformation-absorbing rubber layer arranged along an upper rubber stock of the bead filler and having a Shore A hardness of not more than 55°.

18 Claims, 16 Drawing Sheets

FIG_2

FIG_11

FIG_12

FIG_15
PRIOR ART
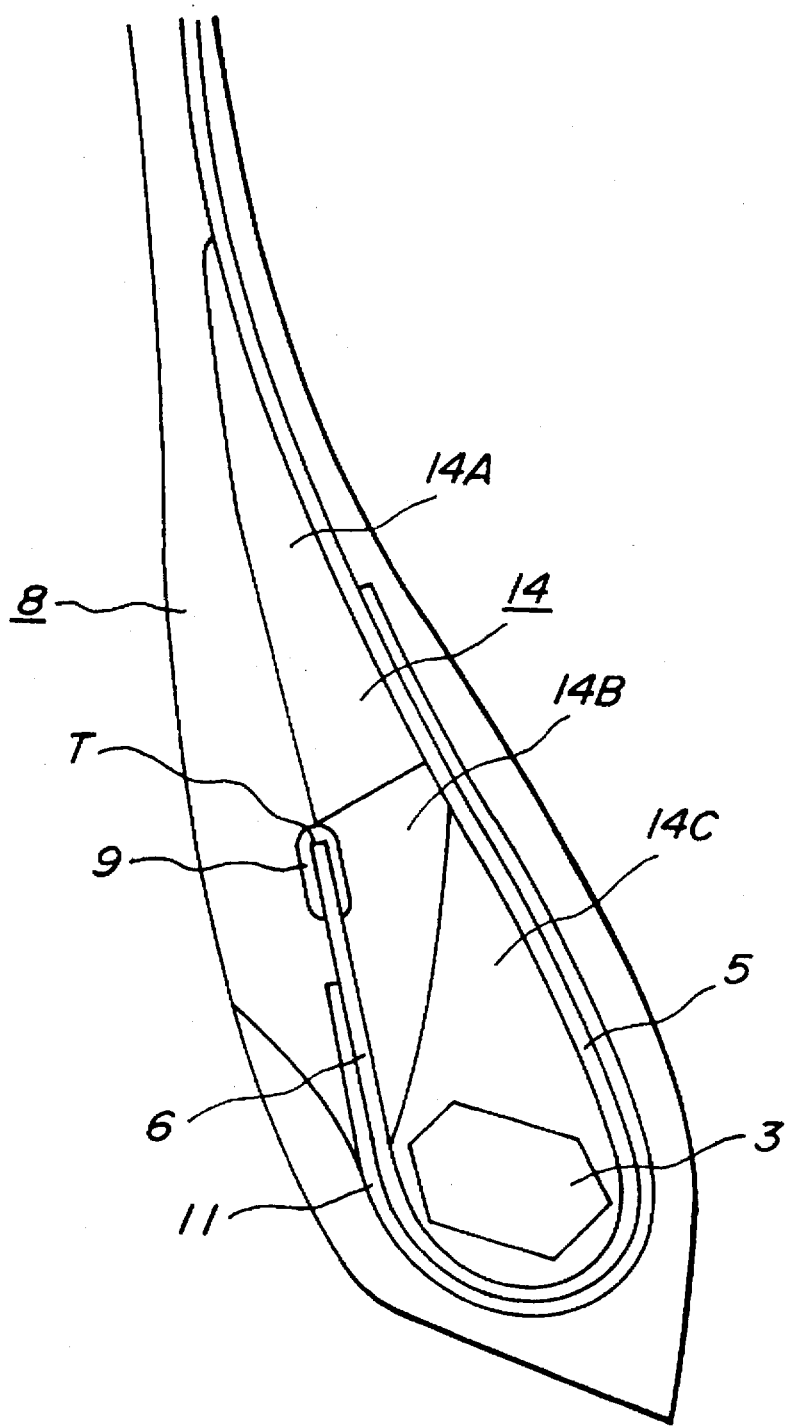

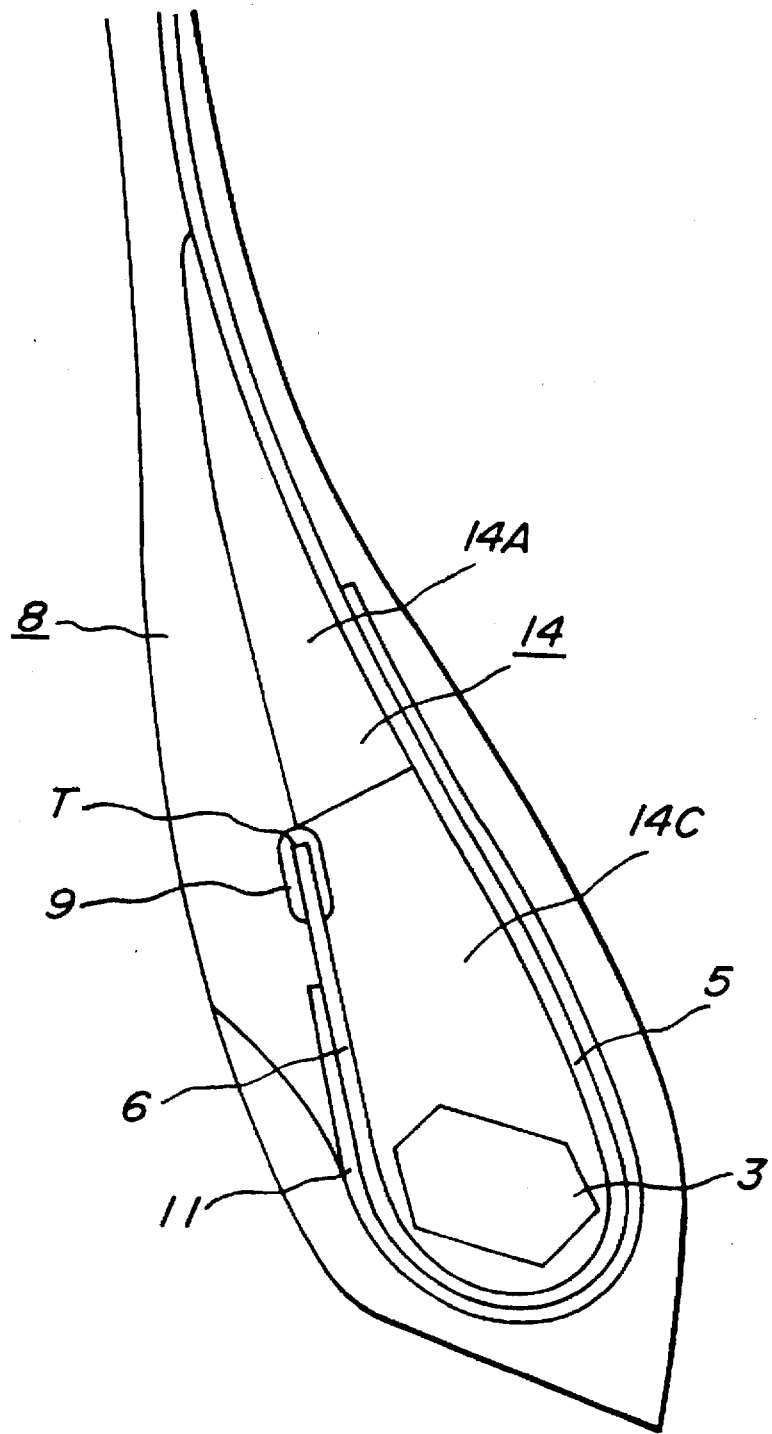
FIG_16
PRIOR ART

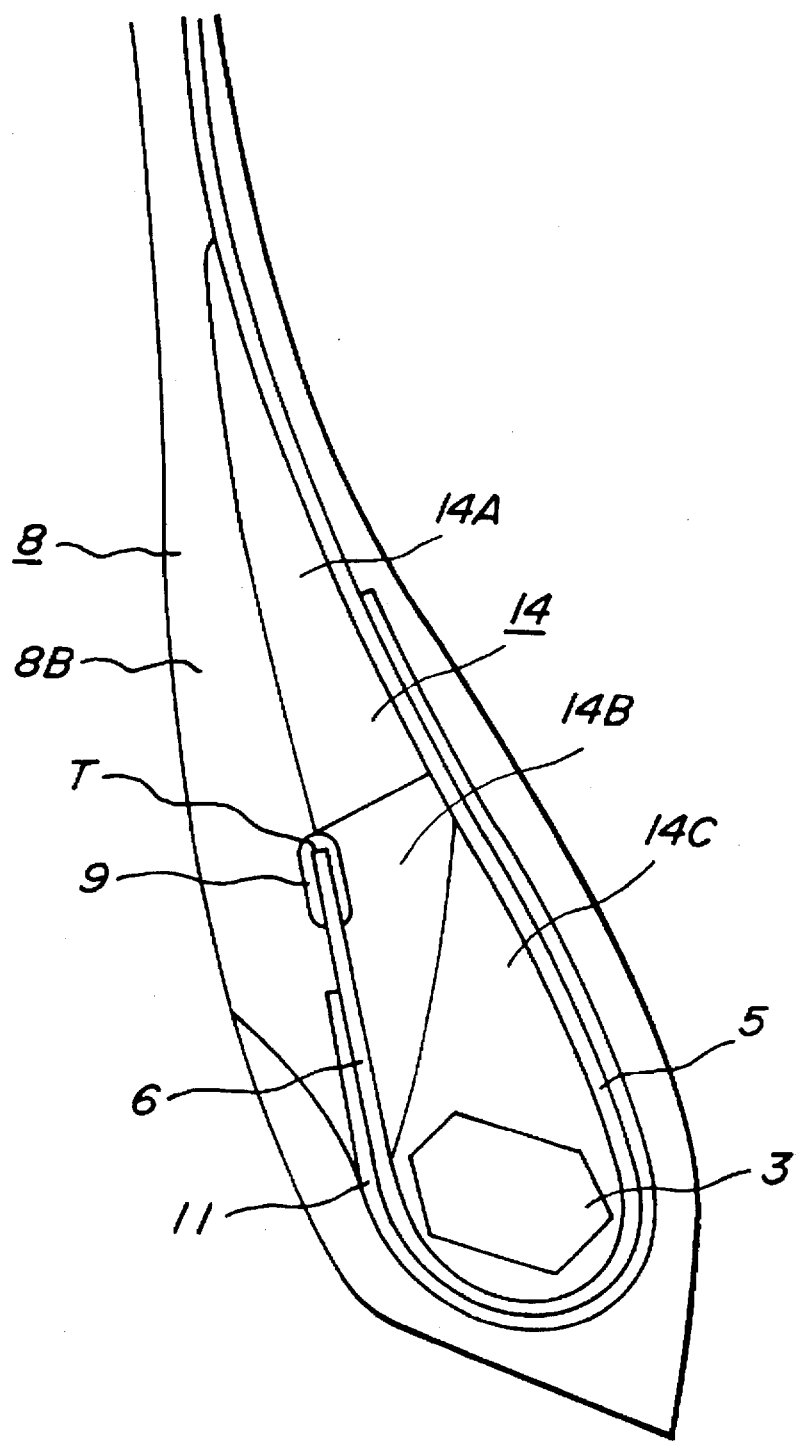
FIG_17
PRIOR ART

HEAVY DUTY PNEUMATIC RADIAL TIRES WITH DEFORMATION-ABSORBING RUBBER LAYER COVERING TURNUP PORTION OUTER SURFACE

BACKGROUND OF THE INVENTION

1. Field of the Invention

This invention relates to pneumatic radial tires, and more particularly to a heavy duty pneumatic radial tire having an improved durability in a bead portion.

2. Description of Related Art

In general, when a pneumatic radial tire is run under load, a reaction force of such loading is produced from a road surface at a ground contact region to bend a sidewall portion of the tire and then the bending deformation is transmitted to a bead portion of the tire. This bending deformation is considerably large in heavy duty pneumatic radial tires for truck and bus using steel cords as a cord for a carcass ply and being run at a high internal pressure under a high loading.

In the heavy duty pneumatic radial tire, the carcass ply comprised of inextensible cords having a modulus of elasticity of not less than 2500 kg/mm$^2$ such as steel cords and the like is wound around a bead core from inside to the tire toward outside to form a turnup portion and further a bead portion reinforcing cord layer is arranged outside the turnup portion therealong. Since the turnup portion and the bead portion reinforcing layer are hardly deformed, a large compression strain is generated in rubber surrounding an outward end of the turnup portion and the like in the radial direction of the tire due to the above bending deformation. Such a compression strain is repeatedly generated each rotation of the tire to create cracking in rubber in the vicinity of the outward end of the turnup portion or the bead portion reinforcing cord layer, which finally brings about the occurrence of separation failure.

In order to prevent the occurrence of separation failure, a combination of hard rubber stock and soft rubber stock is disposed between the carcass ply and its turnup portion above the bead core as a bead filler in such a manner that the hard rubber stock is arranged near to the side of the bead core and the soft rubber stock is arranged near to the outward end of the turnup portion as disclosed in JP-A-4-27606 and JP-A-5-16618. In this case, the bending deformation transmitted to the bead portion is absorbed and mitigated by the deformation of easily deformable soft rubber stock to reduce the compression strain generated in the vicinity of the outward turnup end portion, whereby the occurrence of cracking, separation failure or the like is controlled or prevented.

Recently, the wear resistance of the tread rubber has been considerably improved to further prolong the service life and also the section profile of the tire becomes lower even in heavy duty pneumatic radial tires. Therefore, the external force applied to the bead portion of this tire increases and the conditions required for the bead portion become more severe. As a result, it is strongly demanded to further improve the durability of the bead portion in the heavy duty pneumatic radial tire.

SUMMARY OF THE INVENTION

It is, therefore, an object of the invention to provide heavy duty pneumatic radial tires provided with a bead filler comprised of at least two rubber stocks having different hardnesses, and having an improved durability of a bead portion for controlling or preventing the occurrence of separation failure in the bead portion.

According to the invention, there is the provision of in a heavy duty pneumatic radial tire comprising a tread portion, a pair of sidewall portions extending inward from both side ends of the tread portion in a radial direction of the tire, a pair of bead portions extending inward from the sidewall portions and containing a pair of bead cores therein, at least one radial carcass ply extending between the bead cores and wound around each of the bead cores from inside of the tire toward outside thereof to form a turnup portion and containing cords having a modulus of elasticity of not less than 2500 kg/mm$^2$ therein, and a bead filler extending upward and taperingly from the bead core over an outward end of the turnup portion in the radial direction and comprised of at least two rubber stocks in which a lower part near to the bead core is a hard rubber stock and an upper part is a soft rubber stock, the improvement wherein at least a part of an outer surface of the turnup portion in axial direction of the tire is covered with a deformation-absorbing rubber layer arranged along the soft rubber stock so as to extend outward over the outward end of the turnup portion in the radial direction and having a Shore A hardness of not more than 55°.

In preferred embodiments of the invention, the deformation-absorbing rubber layer and the soft rubber stock are made from substantially the same rubber material, and a length of the outer surface of the turnup portion covered with the deformation-absorbing rubber layer is 3 to 30 times a diameter of the cord included in the turnup portion, and a maximum thickness of the deformation-absorbing rubber layer in the axial direction is 1 to 10 times the diameter of the cord included in the turnup portion, and the Shore A hardness of the deformation-absorbing rubber layer is 38°–55° and the Shore A hardness of the hard rubber stock is not less than 58°, preferably 58°–68°, and a ply end rubber similar to a coating rubber of the carcass ply is arranged on the outward end of the turnup portion so as to extend inward from the outward end along both surfaces of the turnup portion in the radial direction, and at least one cord chafer having a modulus of elasticity of not less than 2500 kg/mm$^2$ is arranged outside the turnup portion therealong as a bead portion reinforcing cord layer.

BRIEF DESCRIPTION OF THE DRAWINGS

The invention will be described with reference to the accompanying drawings, wherein:

FIG. 15 is a diagrammatically section view of a first conventional bead portion;

FIG. 16 is a diagrammatically section view of a second conventional bead portion; and FIG. 17 is a diagrammatically section view of a third conventional bead portion.

DESCRIPTION OF THE PREFERRED EMBODIMENTS

Figure 1:
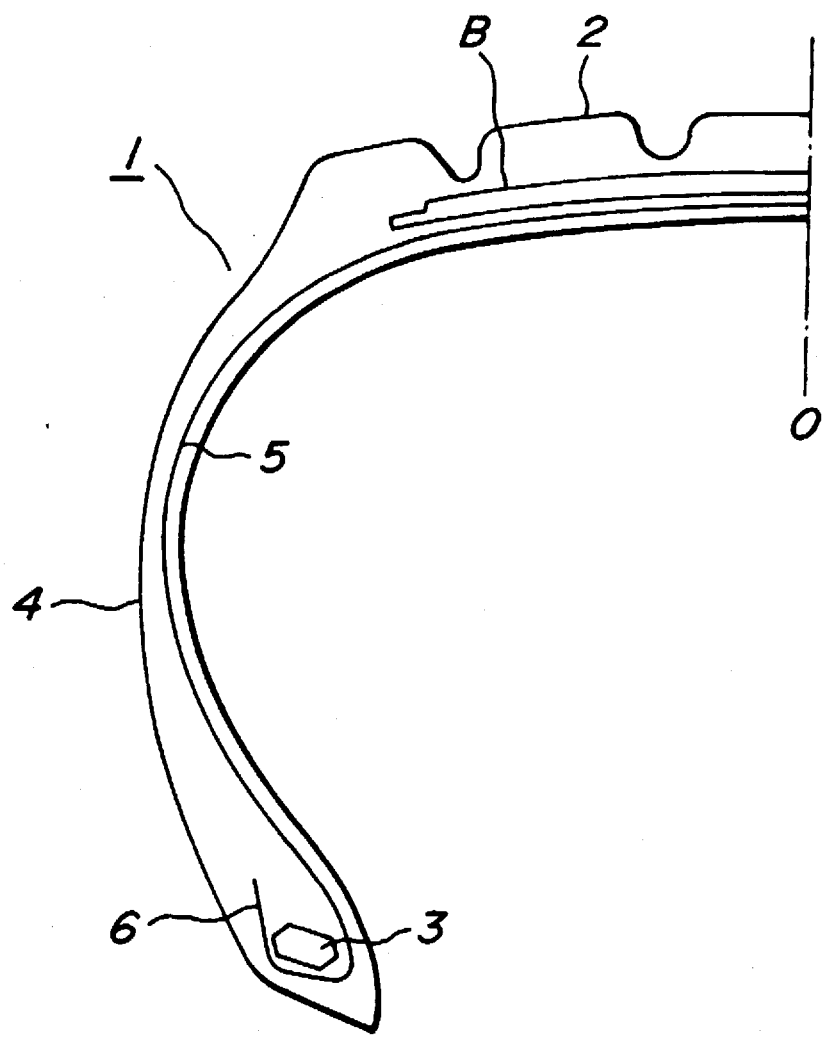
FIG. 1 is a schematically radial half section view of an embodiment of the heavy duty pneumatic radial tire according to the invention.

The inventors have made various studies on causes of the separation failure in the heavy duty pneumatic radial tire and found the following facts.

That is, when the tire is mounted onto a rim and inflated under a high internal pressure, compression deformation is created in rubber sandwiched between the turnup portion of the carcass ply in the bead portion and the rim flange by reaction force of the internal pressure. Since rubber is incompressible, however, the rubber is moved outward from the end of the rim flange in the radial direction by an amount of the compression deformation. On the other hand, since the carcass ply comprises cords having a modulus of elasticity of not less than 2500 kg/mm$^2$, such as steel cord or aromatic polyamide cord, the turnup end portion of the carcass ply hardly deforms and hence shearing strain is generated in rubber located outside the turnup end in the axial direction of the tire.

Further, when the tire is run under load, a pair of the sidewall portions located at the ground contact region are largely bent but also the bead portion located outward from the rim flange in the radial direction of the tire falls down outward in the axial direction of the tire. As a result, a large compression strain is applied to the turnup end portion of the carcass ply existing in the sidewall portion near to the bead portion.

Furthermore, the movement of rubber in a substantially circumferential direction is caused in a zone ranging from the bead portion to the sidewall portion located at positions corresponding to stepping-in and kicking-out portions of the ground contact region in the tire tread, whereby a shearing strain is applied to the turnup portion of the carcass ply. The above compression strain and shearing strain are repeatedly applied to the turnup end portion of the carcass ply during the running of the tire, whereby rubber fatigue is promoted to cause rubber cracking along the turnup end portion and finally bring about the occurrence of separation failure.

In this type of the conventional tire, the bead filler comprised of hard rubber stock and soft rubber stock is disposed between the carcass ply and its turnup portion to arrange the hard rubber stock near the bead core and the soft rubber stock near to the turnup end portion in the radial direction as previously mentioned. In this case, the bending deformation transmitted to the bead portion is absorbed by the soft rubber stock to reduce the compression strain in the outward turnup end in the radial direction. In the conventional tire, however, any countermeasure on the large compression strain and shearing strain produced in the rubber surrounding the turnup end portion of the carcass ply or the like is not arranged outside the turnup end portion in the axial direction of the tire, so that cracking is created in such a rubber to grow into the separation failure.

In order to solve the aforementioned problem in the conventional tire, according to the invention, at least a part of the outer surface of the turnup portion in the axial direction of the tire is covered with a deformation-absorbing rubber layer arranged along the soft rubber stock so as to extend outward over the outward end of the turnup portion in the radial direction and having a Shore A hardness of not more than 55°. Therefore, when the tire according to the invention is mounted onto a rim under a given internal pressure and run under loading, the shearing strain and compression strain resulted from the movement of rubber between the rim flange and the turnup portion are absorbed by the deformation-absorbing rubber layer which is soft and easily deformable as compared with the surrounding rubber. As a result, the occurrence of cracking in rubber near to the outward turnup end portion is prevented to more improve the durability of the bead portion.

In general, when the radial carcass is comprised of at least one rubberized cord ply containing cords having a modulus of elasticity of not less than 2500 kg/mm$^2$, cracking is apt to be caused in rubber located near to the outward turnup end portion in the radial direction outward in the axial direction to finally induce the separation failure. In order to prevent the occurrence of cracking, therefore, it is effective to reduce the compression strain in the vicinity of the outward turnup end portion in the radial direction by 20% or more as compared with the conventional tire. For this end, in the invention, the length of the outer surface of the turnup portion covered with the deformation-absorbing rubber layer is preferably within a range of 3 to 30 times a diameter of the cord included in the turnup portion. When the covered length of the outer surface of the turnup portion is less than 3 times the diameter of the cord, the effect of reducing the compression strain in the outward turnup end portion to at least 20% is not obtained. When it exceeds 30 times the cord diameter, the effect of reducing the compression strain through the deformation-absorbing rubber layer becomes very large, but the bead portion is softened to increase the falling-down deformation toward the carcass ply and hence the effect of reducing the compression strain to at least 20% is not obtained.

Further, the maximum thickness of the deformation-absorbing rubber layer in the axial direction is restricted to be within a range of 1 to 10 times the diameter of the cord included in the turnup portion. When the maximum thickness is less than 1 times, the region of absorbing the compression strain becomes narrower and the effect of reducing the compression strain is not obtained, while when it exceeds 10 times, the effect of reducing the compression strain through the deformation-absorbing rubber layer becomes large, but the bead portion is softened to increase the falling-down deformation toward the carcass ply and hence the effect of reducing the compression strain to at least 20% is not obtained.

In the tire according to the invention, the deformation-absorbing rubber layer is arranged along the soft rubber stock constituting the bead filler to cover the outward turnup end portion of the carcass ply from both sides. From a viewpoint of the ease of the tire production, it is favorable that the deformation-absorbing rubber layer and the soft rubber stock are united together with each other during vulcanization after the green tire building step. That is, when the one-piece body of the bead filler and the deformation-absorbing rubber layer is used without division, the number of tire components is decreased to improve the productivity, but the number of steps in the production of the tire is inversely increased to lower the productivity. This occurs because, there is added a troublesome step where the deformation-absorbing rubber layer portion is first folded outward in the radial direction of the tire and the carcass ply is wound around the bead core from the inside toward outside and then the above folded rubber layer is returned to the original position to cover the outward turnup end portion from the outside in the axial direction. On the other hand, it is usual to first form the bead filler comprising an outermost rubber stock, a middle rubber stock and an innermost rubber stock at a separate step and then stick it onto the carcass ply at the tire building step. But, if the deformation-absorbing rubber layer is united with the outermost rubber stock, there is added a complicated step that the innermost and middle rubber stocks are united together at a separate step and stuck onto the carcass ply. Thereafter the carcass ply is wound around the bead core and then the one-piece body of the outermost rubber stock and deformation-absorbing rubber layer is stuck thereonto with careful positioning and hence the productivity is lowered. In any case, it is advantageous to use the deformation-absorbing rubber layer and the bead filler separately before the vulcanization step in view of the improvement of the tire productivity.

In the invention, the Shore A hardness of the deformation-absorbing rubber layer is not more than 55°, preferably 38°–55°, while the Shore A hardness of the soft rubber stock is equal to or somewhat larger than that of the deformation-absorbing rubber layer and the Shore A hardness of the hard rubber stock is not less than 58°, preferably 58°–68° in case of the bead filler consisting of two rubber stocks. Moreover, when the bead filler is comprised of an outermost soft rubber stock, a middle rubber stock and an innermost hard rubber stock in the radial direction, it is desirable that the Shore A hardness is 38°–55° in the outermost soft rubber stock, 58°–68° in the middle rubber stock, and not less than 75° in the innermost hard rubber stock, respectively.

That is, even if the sidewall portion of the tire is largely deformed at the ground contact region under loading, such deformation is absorbed by the deformation of the deformation-absorbing rubber layer and the outermost soft rubber stock to reduce the compression strain produced at the outward turnup end of the carcass ply or the bead portion reinforcing layer in the radial direction, whereby the occurrence of the separation failure is suppressed or prevented. When the Shore A hardness of the deformation-absorbing rubber layer is more than 55°, the absorption of the above deformation is insufficient and the separation failure is apt to be caused. If the Shore A hardness of the deformation-absorbing rubber layer is less than 38°, the absorption of the deformation becomes excessive and hence the separation failure is apt to be caused at the boundary between the outermost soft rubber stock in the radial direction and the carcass ply.

In the bead filler consisting of two rubber stocks, when the Shore A hardness of the hard rubber stock is less than 58°, the bead filler becomes softer as a whole and the deformation of the sidewall portion becomes larger at the ground contact region. Hence, the shearing strain is apt to be concentrated in the inside of the outward turnup end portion in the axial direction to cause the separation failure. When it exceeds 68°, the rigidity of the bead portion is too high and heat generation of the bead portion and an increase of the rolling resistance may occur requiring separate countermeasures. In the bead filler consisting of three rubber stocks, when the Shore A hardness of the innermost hard rubber stock is less than 75°, the deformation of the carcass ply and shape distortion in the bead portion can not sufficiently be controlled.

According to the invention, the ply end rubber similar to a coating rubber of the carcass ply is arranged on the outward end of the turnup portion to extend inward from the outward end along both surfaces of the turnup portion in the radial direction, whereby the outward turnup end is protected by the ply end rubber and advantageously separated from the shearing strain resulted from the movement of rubber between the rim flange and the turnup portion.

Furthermore, at least one cord chafer having a modulus of elasticity of not less than 2500 kg/mm$^2$ such as aromatic polyamide cord, steel cord or the like is arranged outside the turnup portion therealong as a bead portion reinforcing cord layer. According to the invention, the occurrence of separation failure can be suppressed or prevented even when using the above chafer.

In FIG. 1 is schematically shown a radial half section of an embodiment of the heavy duty pneumatic radial tire according to the invention, in which numeral 1 is a tubeless tire for truck and bus having a tire size of 11/70R22.5, numeral 2 a tread portion, numeral 3 a bead core, numeral 4 a sidewall portion, numeral 5 a radial carcass ply, numeral 6 a turnup portion of the carcass ply, symbol B a belt of inextensible cord layers, and symbol O an equatorial plane of the tire.

Figure 2:
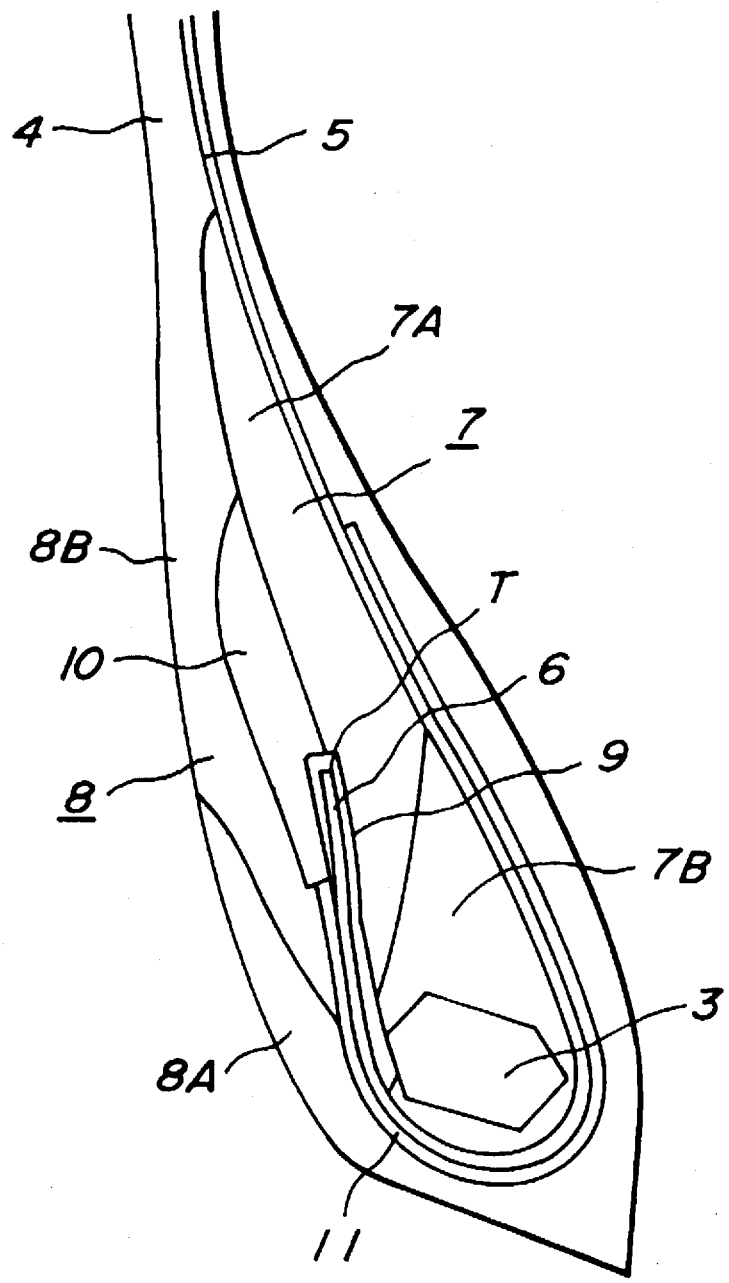
FIG. 2 is a diagrammatically section view of a first embodiment of the bead portion according to the invention.

In FIG. 2 is shown a diagrammatically enlarged section of a first embodiment of the bead portion applied to the tire 1 according to the invention, in which a bead filler 7 consisting of an outer soft rubber stock 7A and an inner hard rubber stock 7B is disposed between the carcass ply 5 and its turnup portion 6 to extend taperingly from a position near to an outward surface of the bead core 3 over an outward end T of the turnup portion 6 in a radial direction of the tire. Outer surfaces of the turnup portion 6 and the soft rubber stock 7A of the bead filler in the axial direction of the tire are covered with a coating rubber 8 for the bead portion. Furthermore, a ply end rubber 9 similar to a coating rubber for the carcass ply is arranged around the outward end T of the turnup portion 6 to extend inward along both sides of the turnup portion 6 in the radial direction. Moreover, a deformation-absorbing rubber layer 10 having a Shore A hardness of 38°–55°, which is lower than those of the coating rubber 8 and the ply end rubber 9, is arranged between the coating rubber 8 and the soft rubber stock 7A to extend outward from a position overlapping with the outward surface of the ply end rubber 9 in the axial direction over the outward end T in the radial direction.

In the tire of FIGS. 1 and 2, the carcass ply 5 is a single rubberized cord ply containing steel cords of 3+9+15× 0.175+1 twisting structure arranged at a cord angle perpendicular to the equatorial plane O and the outward end T of the turnup portion 6 is terminated at a position somewhat outward exceeding a top of a rim flange (not shown) in the radial direction when the tire is mounted onto a rim. The bead filler 7 consists of the hard rubber stock 7B extending above the outer surface of the bead core 3 slantly and outward from a position of the turnup portion 6 near to the bead core 3 in the radial direction. The soft rubber stock 7A is disposed thereon and extends taperingly over the outward end T of the turnup portion 6 in the radial direction.

The ply end rubber 9 has a thickness of about 1 mm and a Shore A hardness of 68°–82° substantially equal to that of the coating rubber for the carcass ply. The coating rubber 8 for the bead portion consists of a hard rubber stock 8A arranged in a region contacting with the rim and having an excellent resistance to friction and a relatively soft rubber stock 8B for the sidewall portion 4 extending inward in form of a wedge to terminate between the hard rubber stock 8A and the turnup portion 6 and having an excellent bending resistance.

The deformation-absorbing rubber layer 10 has a Shore A hardness lower than those of the rubber stock 8A and the ply end rubber 9. In this case, it is preferable that a difference of hardness between the deformation-absorbing rubber layer 10 and the rubber stock 8A or ply end rubber 9 is within a range of 8°–30°. Moreover, the length of the turnup portion 6 covered with the deformation-absorbing rubber layer 10 corresponds to fourteen times a diameter of the cord in the carcass ply, while the maximum thickness of the deformation-absorbing rubber layer 10 in the axial direction corresponds to three times the diameter of the cord in the carcass ply.

In the embodiment of FIG. 2, a bead portion reinforcing layer 11 containing steel cords of 3×0.24+9×0.255+1 twisting structure therein is arranged from a position contacting with a lower end of the deformation-absorbing rubber layer 10 along the turnup portion 6 toward the carcass ply 5. The steel cords in the reinforcing layer 11 are preferably inclined at a cord angle of 50°–70° with respect to the arranging direction of the cord in the carcass ply 5.

In the invention, each length of the ply end rubber 9 extending from the outward end T along both sides thereof may be about 10 mm. In this case, a space produced between the lower end of the ply end rubber 9 and the upper end of the reinforcing layer 11 is filled with an inner end portion of the deformation-absorbing rubber layer 10 in the radial direction.

Figure 3:
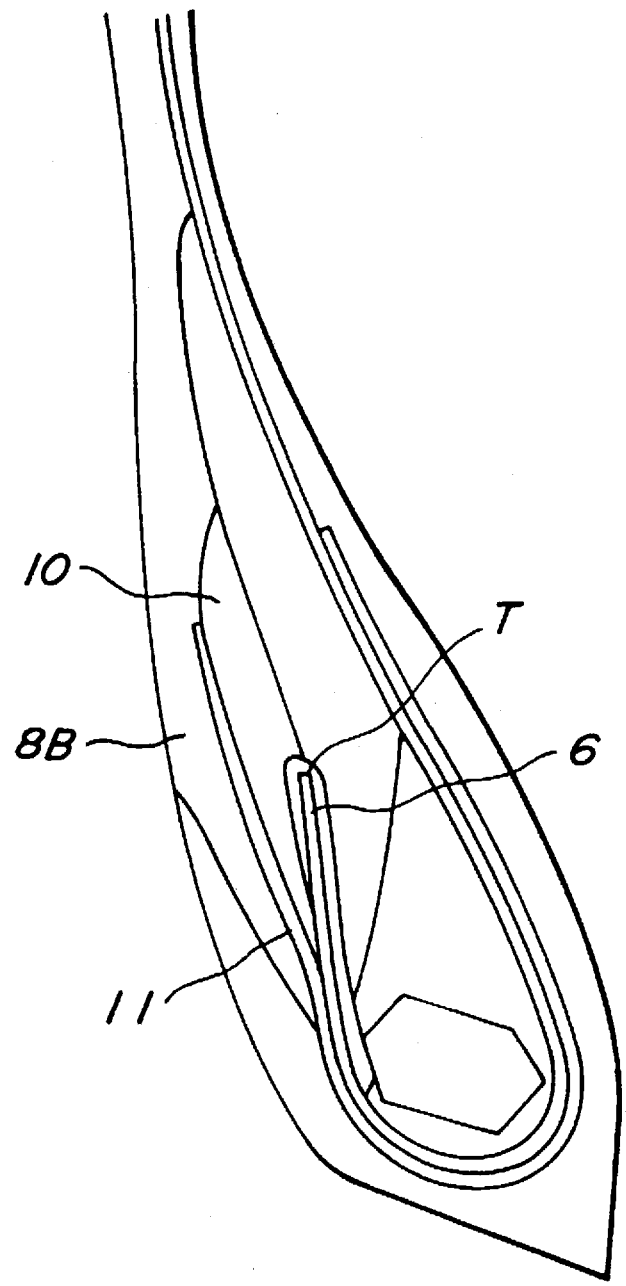
FIG. 3 is a diagrammatically section view of a second embodiment of the bead portion according to the invention.

FIG. 3 illustrates a diagrammatically enlarged section of a second embodiment of the bead portion applied to the tire 1 according to the invention. This embodiment is a modification of the first embodiment shown in FIG. 2 in which one end of the bead portion reinforcing layer 11 is extended outward between the rubber stock 8B and the deformation-absorbing rubber layer 10 along the outer surface of the rubber layer 10 over the outward end T of the turnup portion 6 in the radial direction. In this case, the length of the turnup portion 6 covered with the deformation-absorbing rubber layer 10 corresponds to eighteen times a diameter of the cord in the carcass ply.

Figure 4:
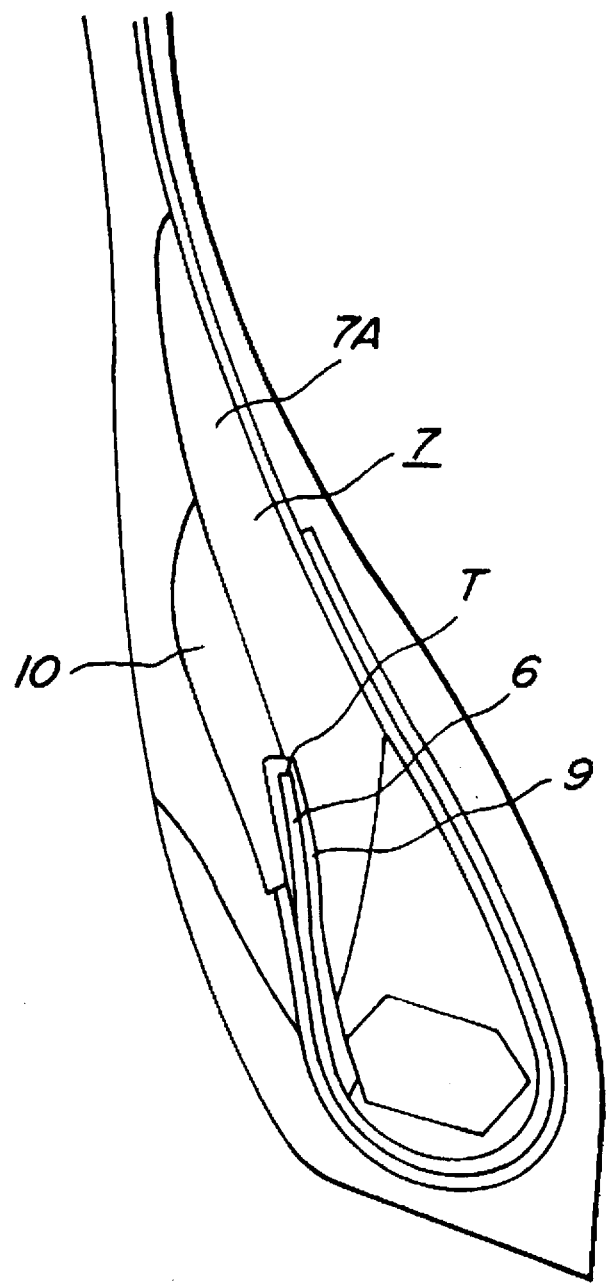
FIG. 4 is a diagrammatically section view of a third embodiment of the bead portion according to the invention.

FIG. 4 illustrates a diagrammatically enlarged section of a third embodiment of the bead portion applied to the tire 1 according to the invention. This embodiment is a modification of the first embodiment shown in FIG. 2 in which the deformation-absorbing rubber layer 10 is made from the same rubber material as the rubber stock 7A of the bead filler 7. As a result, the ply end rubber 9 arranged around the outward end T is sandwiched between the rubbers having a hardness lower than that of the ply end rubber from both sides in the axial direction. In this case, the number of rubber types used in the tire is decreased to improve the productivity.

Figure 5:
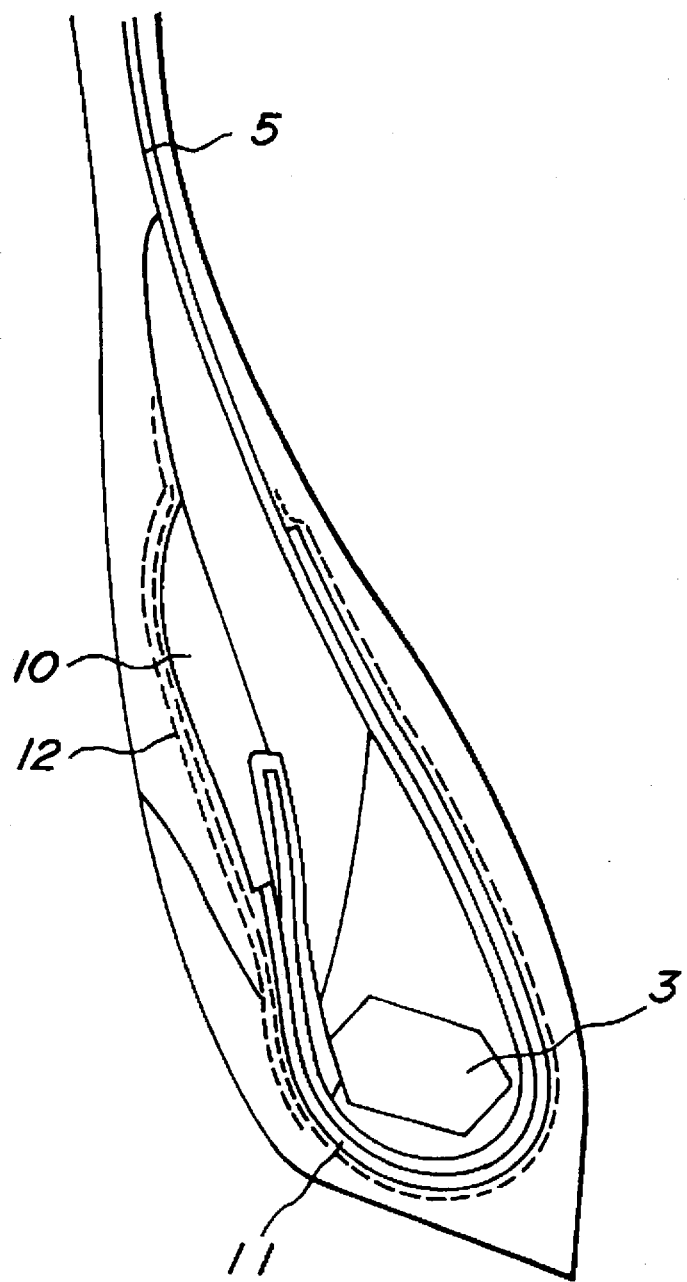
FIG. 5 is a diagrammatically section view of a fourth embodiment of the bead portion according to the invention.

In FIG. 5 is shown a diagrammatically enlarged section of a fourth embodiment of the bead portion applied to the tire 1 according to the invention. This embodiment is a modification of the first embodiment shown in FIG. 2 in which two fiber cord layers 12 each containing nylon cords of 1260 d/2 are further arranged outside the bead portion reinforcing layer 11. In this case, one of two layers 12 is extended from a position covering one end of the reinforcing layer 11 side the carcass ply 5 over the other end thereof to the outward end of the deformation-absorbing rubber layer 10, while the other layer 12 extends from a position of a bead base to a position slightly exceeding the outward end of the deformation-absorbing rubber layer 10. The cords of the layers 11 and 12 are crossed with each other in opposite directions. Moreover, the cords of the layers 12 are preferably inclined at a cord angle of 40°–50° with respect to the arranging direction of the cord in the carcass ply.

Figure 6:
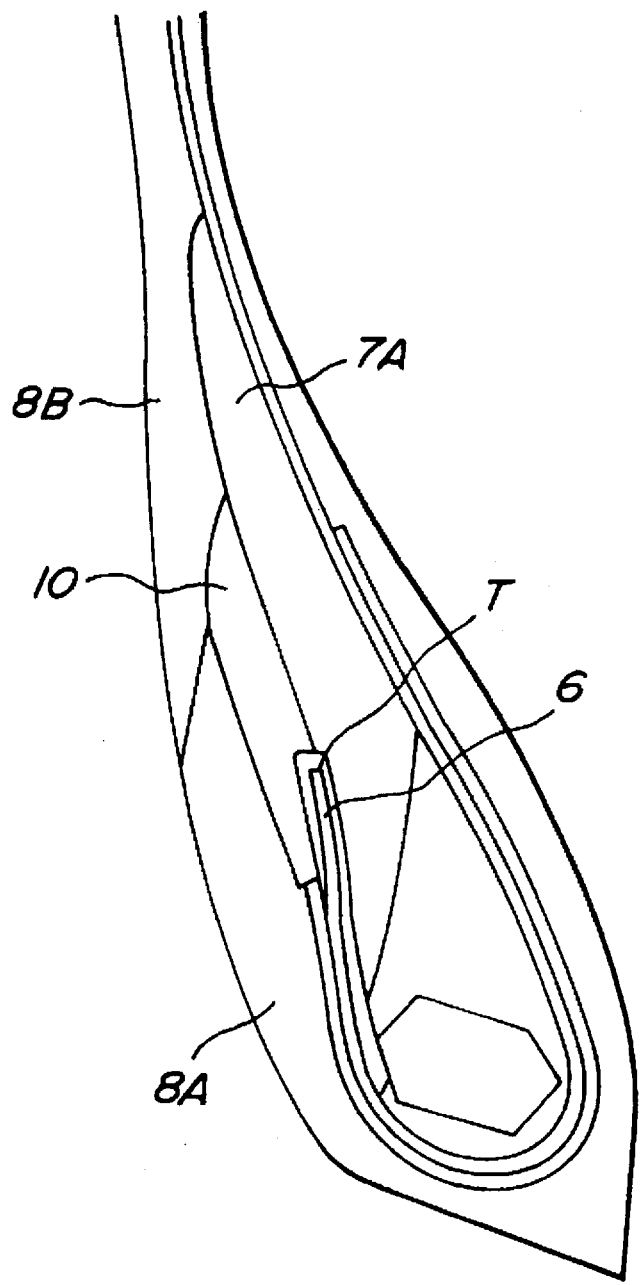
FIG. 6 is a diagrammatically section view of a fifth embodiment of the bead portion according to the invention.

In FIG. 6 is shown a diagrammatically enlarged section of a fifth embodiment of the bead portion applied to the tire 1 according to the invention. This embodiment is a modification of the first embodiment shown in FIG. 2 in which the rubber stock 8A of the coating rubber 8 is extended outward over the outward end T of the turnup portion 6 and the deformation-absorbing rubber layer 10 is sandwiched among the rubber stocks 7A, 8A and 8B.

Figure 7:
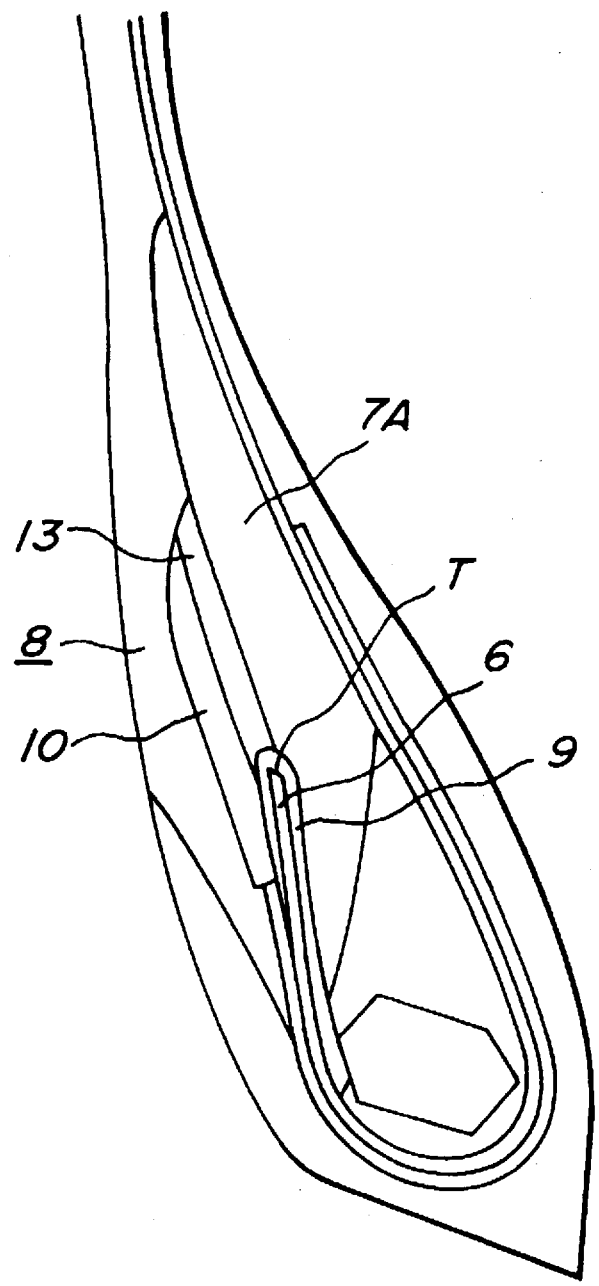
FIG. 7 is a diagrammatically section view of a sixth embodiment of the bead portion according to the invention.

FIG. 7 illustrates a diagrammatically enlarged section of a sixth embodiment of the bead portion applied to the tire 1 according to the invention. This embodiment is a modification of the first embodiment shown in FIG. 2 in which a spacing rubber layer 13 having substantially the same hardness as in the ply end rubber 9 is arranged between the rubber stock 7A of the bead filler and the deformation-absorbing rubber layer 10 to contact at an end of the layer 13 with the ply end rubber 9 and substantially extend on an extension line of the turnup portion 6. In this case, the Shore A hardness of the spacing rubber layer 13 is preferably 68°–82°.

In the second, fourth and sixth embodiments, the effect of absorbing the shearing strain by the deformation-absorbing rubber layer 10 is maintained, while the bending deformation produced under loading causing the shearing strain can be controlled by prolonging the length of the bead portion reinforcing layer 11 in the second embodiment, adding the fiber cord reinforcing layers 12 in the fourth embodiment, or adding the spacing rubber layer 13 to improve the rigidity of the bead portion.

In order to confirm the effect according to the invention, a test for the durability of the bead portion was made with respect to the above tires of the first to sixth embodiments together with a comparative tire having the same structure as in the first embodiment except that the deformation-absorbing rubber layer 10 is omitted or a portion of the deformation-absorbing rubber layer 10 is replaced with the rubber stock 8B.

Details of each of test tires are shown in Table 1.

TABLE 1

|  | First embodiment | Second embodiment | Third embodiment | Fourth embodiment | Fifth embodiment | Sixth embodiment | Comparative tire |
| --- | --- | --- | --- | --- | --- | --- | --- |
| Cord angle of the layer 12 | — | — | — | 45 | — | — | — |
| Hardness of rubber stock 7B | 84 | 84 | 84 | 84 | 84 | 84 | 84 |
| Hardness of | 63 | 63 | 49 | 63 | 63 | 63 | 63 |

TABLE 1-continued

|  | First embodiment | Second embodiment | Third embodiment | Fourth embodiment | Fifth embodiment | Sixth embodiment | Comparative tire |
|---|---|---|---|---|---|---|---|
| rubber stock 7A Hardness of deformation-absorbing rubber layer 10 | 49 | 49 | 49 | 49 | 49 | 49 | — |
| Hardness of ply end rubber 9 | 72 | 72 | 72 | 72 | 72 | 72 | 72 |
| Hardness of spacing rubber layer 13 | — | — | — | — | — | 79 | — |

Note)
1: The hardness means a Shore A hardness (°)
2: The hardnesses of rubber stocks 8A and 8B in the coating rubber 8 are 70° and 58°, respectively.
3: The cord angle of the fiber cord reinforcing layer 12 is with respect to the arranging direction of the cord in the carcass ply.
4: The cord angle of the bead portion reinforcing layer 11 is 60° with respect to the arranging direction of the cord in the carcass ply.

Note)
1: The hardness means a Shore A hardness (°)
2: The hardnesses of rubber stocks 8A and 8B in the coating rubber 8 are 70° and 58°, respectively.
3: The cord angle of the fiber cord reinforcing layer 12 is with respect to the arranging direction of the cord in the carcass ply.
4: The cord angle of the bead portion reinforcing layer 11 is 60° with respect to the arranging direction of the cord in the carcass ply.

The test tire is mounted onto a rim of 22.5×7.50, inflated under an internal pressure of 8.5 kgf/cm², placed on a steel drum of a smooth surface having a radius of 1.7 m under a load of 5000 kgf, and then run thereon at a speed of 60 km/h until the bead portion is broken. The durability of the bead portion is evaluated by an index on the basis that the running distance of the comparative tire is 100. Moreover, the measurement is carried out at a temperature of 46° C.

The test results are shown in Table 2.

TABLE 2

|  | First embodiment | Second embodiment | Third embodiment | Fourth embodiment | Fifth embodiment | Sixth embodiment | Comparative tire |
|---|---|---|---|---|---|---|---|
| Running distance (index) | 125 | 120 | 122 | 135 | 127 | 130 | 100 |

Then, the invention will be described with respect to the heavy duty pneumatic radial tires of seventh to twelfth embodiments according to the invention as shown in FIGS. 8–14, in which the deformation-absorbing rubber layer is united with the rubber stock of the bead filler, together with there conventional tires shown in FIGS. 15–17. These tires have substantially the same tire size and structure as in the above first embodiment unless otherwise specified.

Figure 8:
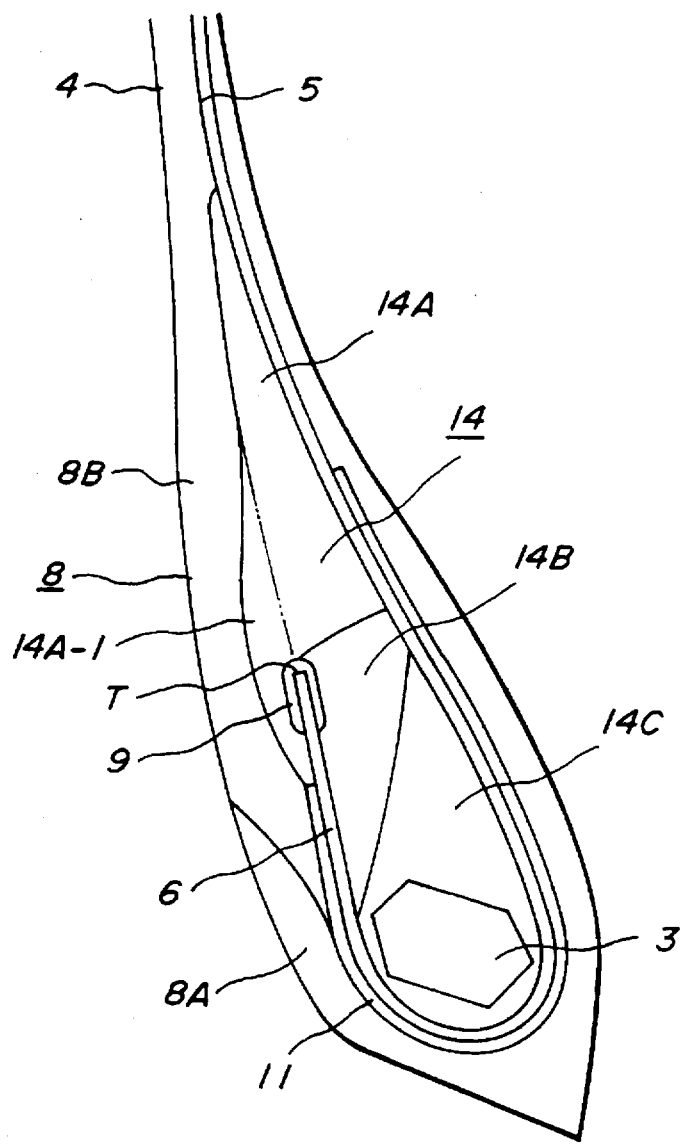
FIG. 8 is a diagrammatically section view of a seventh embodiment of the bead portion according to the invention.

In FIG. 8 is shown a diagrammatically enlarged section of a seventh embodiment of the bead portion applied to the tire 1 according to the invention. This embodiment is a modification of the first embodiment shown in FIG. 2 in which a bead filler 14 consists of three rubber stocks 14A, 14B and 14C instead of the bead filler 7 and a portion 14A-1 of the rubber stock 14A serves as a deformation-absorbing rubber layer. In the bead filler 14, the rubber stock 14A located outward in the radial direction has a Shore A hardness of 49°, and the rubber stock 14B located at a middle position in the radial direction has a Shore A hardness of 63°, and the rubber stock 14C located inward in the radial direction has a Shore A hardness of 84°. Furthermore, the outward surface of the turnup portion 6 in the axial direction is covered with the portion 14A-1 of the rubber stock 14 serving as the deformation-absorbing rubber layer. Moreover, the length of the outward surface of the turnup portion covered with the rubber stock portion 14A-1 is 15 mm as measured inward from the outward end T of the turnup portion 6 in the radial direction, which corresponds to about 14 times the diameter of the cord used in the carcass ply 5, while the maximum thickness of the rubber stock portion 14A-1 in the axial direction covering the outward surface of the turnup portion is 3 mm, which corresponds to about 3 times the diameter of the cord used in the carcass ply. And also, the rubber stock 8B of the coating rubber 8 has a Shore A hardness of 58°.

Figure 9A:
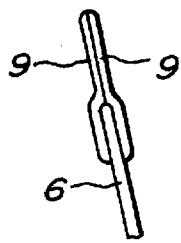
FIGS. 9a and 9b are diagrammatic views illustrating another embodiments of arranging a ply end rubber(s) on an outward turnup end portion of a carcass ply.
Figure 9B:
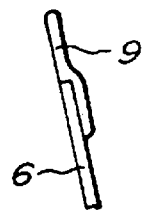

As shown in FIG. 9a, the outward turnup end portion may be covered from both sides with two ply end rubbers 9, or only outward or inward surface of the outward turnup end portion in the axial direction may be covered with the single ply end rubber 9 as shown in FIG. 9b.

Figure 10:
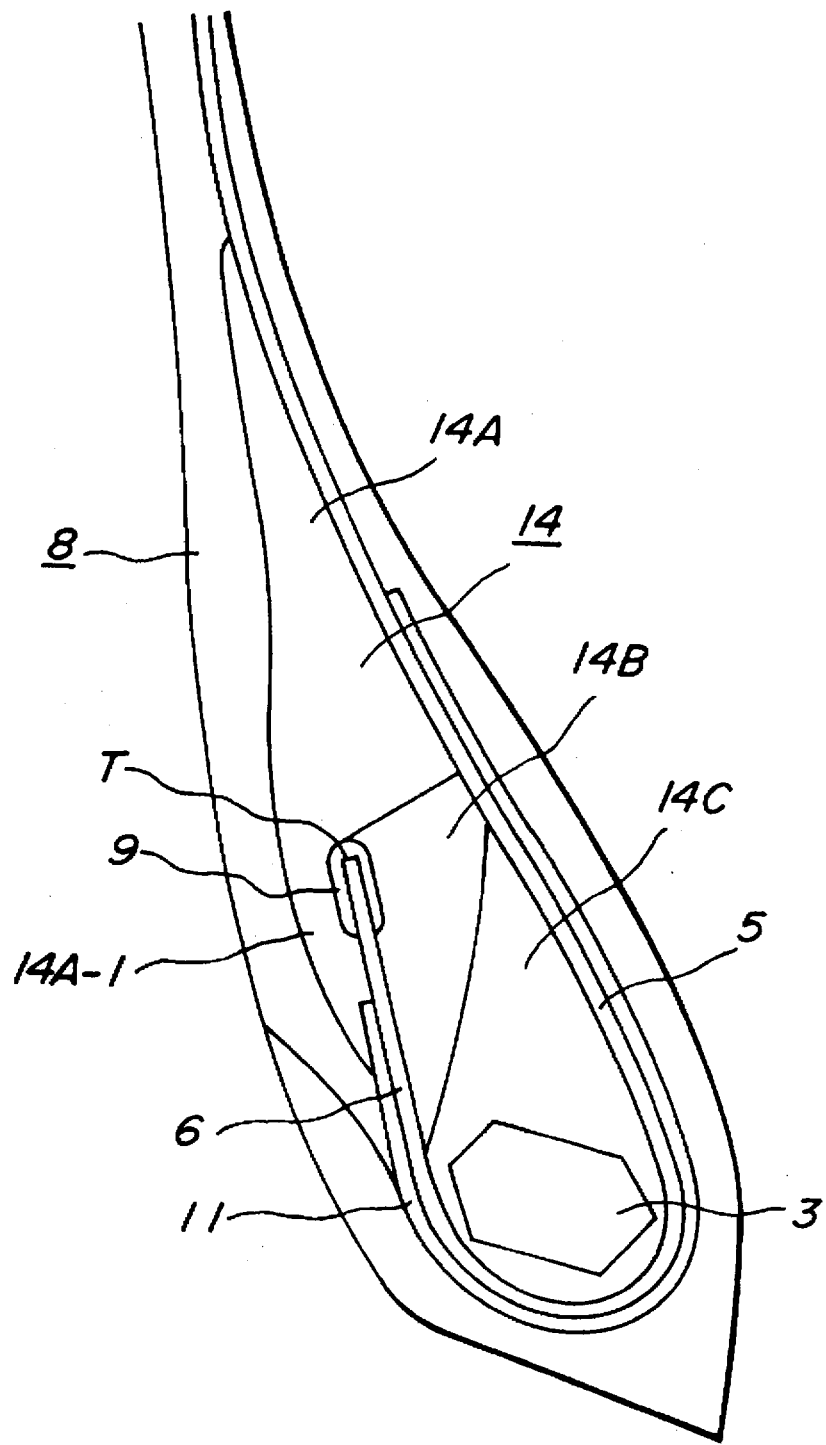
FIG. 10 is a diagrammatically section view of an eighth embodiment of the bead portion according to the invention.

In FIG. 10 is shown a diagrammatically enlarged section of an eighth embodiment of the bead portion applied to the tire 1 according to the invention. This embodiment is a modification of the seventh embodiment shown in FIG. 9 in which the rubber stock portion 14A-1 extends inward from an outward end of the bead portion reinforcing layer 11 over the inward end of the ply end rubber 9 in the radial direction to cover a part of the layer 11. In this case, the total length of the outward surface of the turnup portion and a part of the reinforcing layer 11 covered with the rubber stock portion 14A-1 is 20 mm as measured inward from the outward end T of the turnup portion 6 in the radial direction, which corresponds to about eighteen times the diameter of the cord used in the carcass ply 5.

Figure 11:
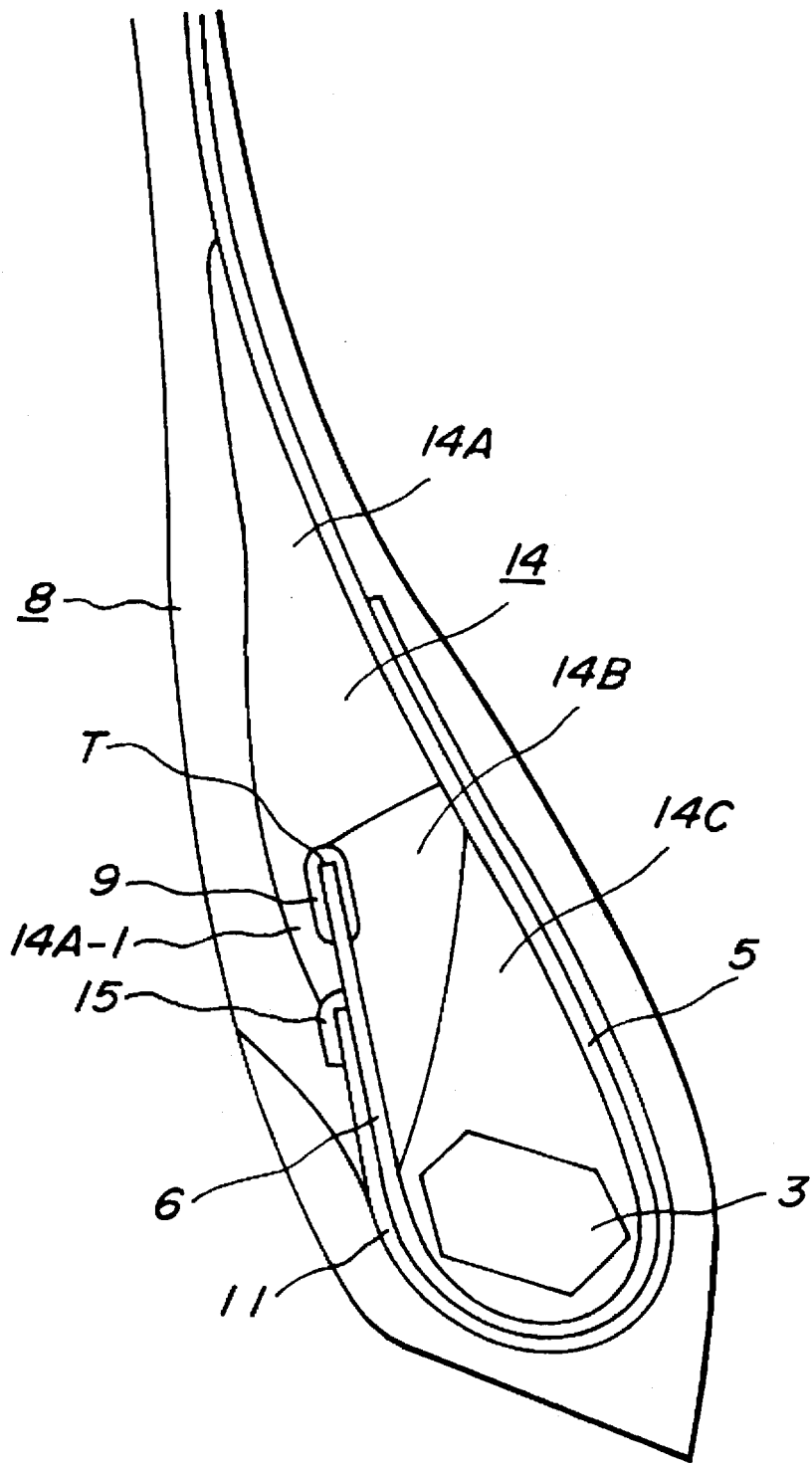
FIG. 11 is a diagrammatically section view of a ninth embodiment of the bead portion according to the invention.

In FIG. 11 is shown a diagrammatically enlarged section of a ninth embodiment of the bead portion applied to the tire 1 according to the invention. This embodiment is a modification of the seventh embodiment shown in FIG. 9 in which a part of the bead portion reinforcing layer 11 ranging inward from its outward end thereof in the radial direction is covered with another ply end rubber 15.

Figure 12:
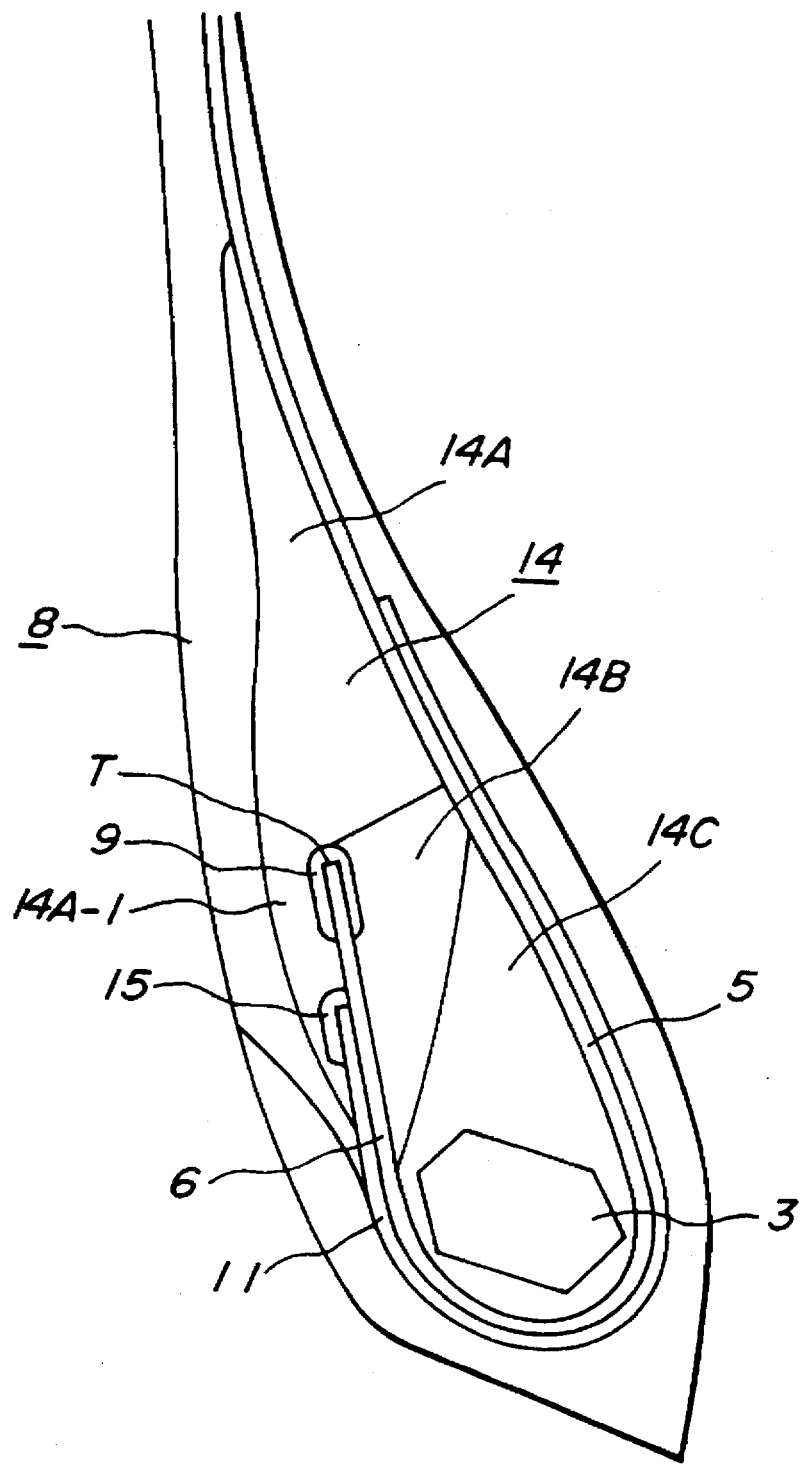
FIG. 12 is a diagrammatically section view of a tenth embodiment of the bead portion according to the invention.

In FIG. 12 is shown a diagrammatically enlarged section of a tenth embodiment of the bead portion applied to the tire 1 according to the invention. This embodiment is a modification of the seventh embodiment shown in FIG. 9 in which a part of the bead portion reinforcing layer 11 ranging inward from its outward end thereof in the radial direction is covered with another ply end rubber 15 and the rubber stock portion 14A-1 is further extended over the ply end rubber 15 inward in the radial direction. In this case, the total length of the outward surface of the turnup portion and a part of the reinforcing layer 11 covered with the rubber stock portion 14A-1 is 20 mm as measured inward from the outward end T of the turnup portion 6 in the radial direction, which corresponds to about eighteen times the diameter of the cord used in the carcass ply 5.

Figure 13:
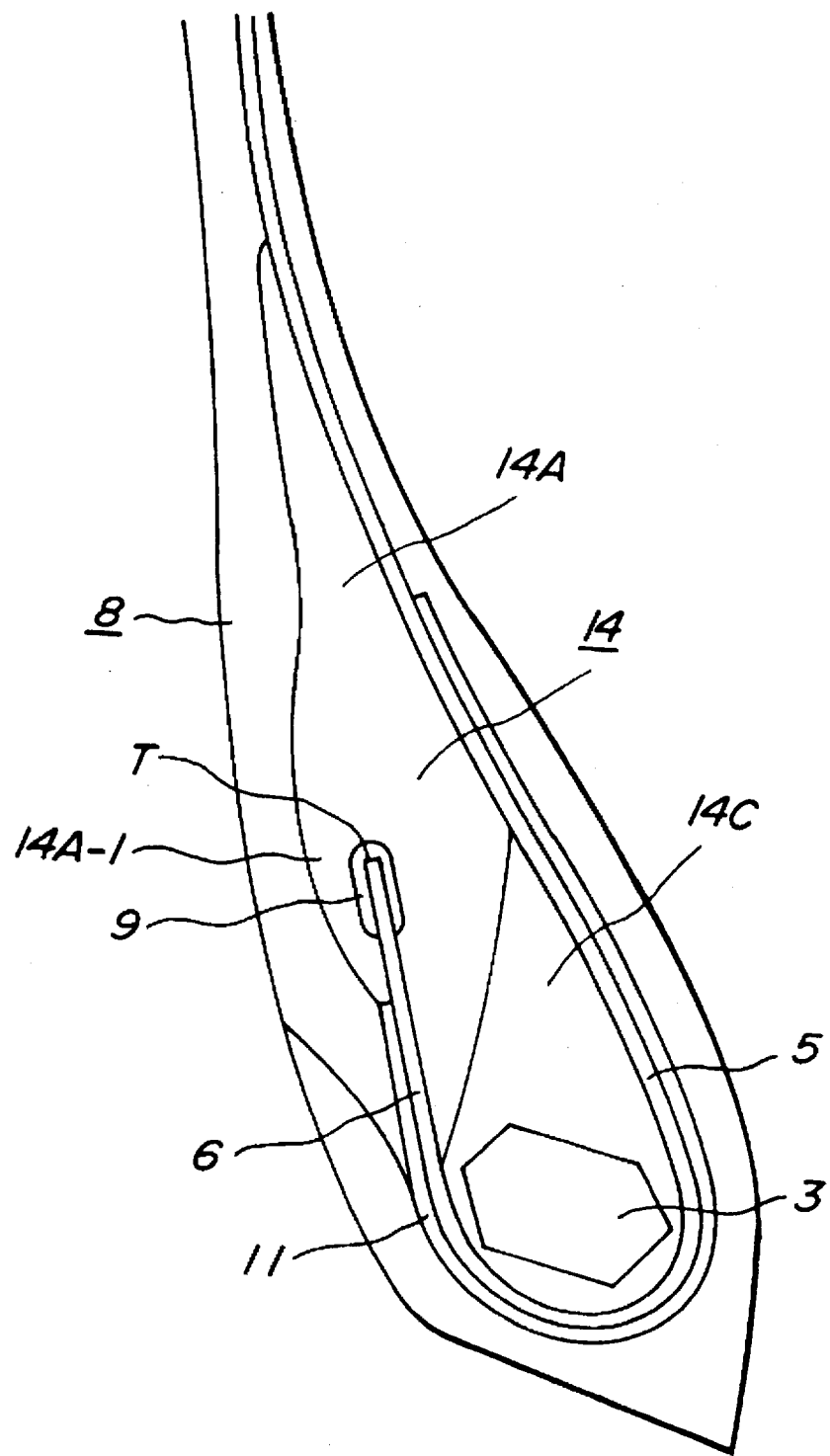
FIG. 13 is a diagrammatically section view of a twelfth embodiment of the bead portion according to the invention.

In FIG. 13 is shown a diagrammatically enlarged section of an eleventh embodiment of the bead portion applied to the tire 1 according to the invention. This embodiment is a modification of the seventh embodiment shown in FIG. 9 in which the bead filler 14 consists of the rubber stock 14A having a Shore A hardness of 49° and the rubber stock 14C having a Shore A hardness of 84° instead of a three rubber stock structure.

Figure 14:
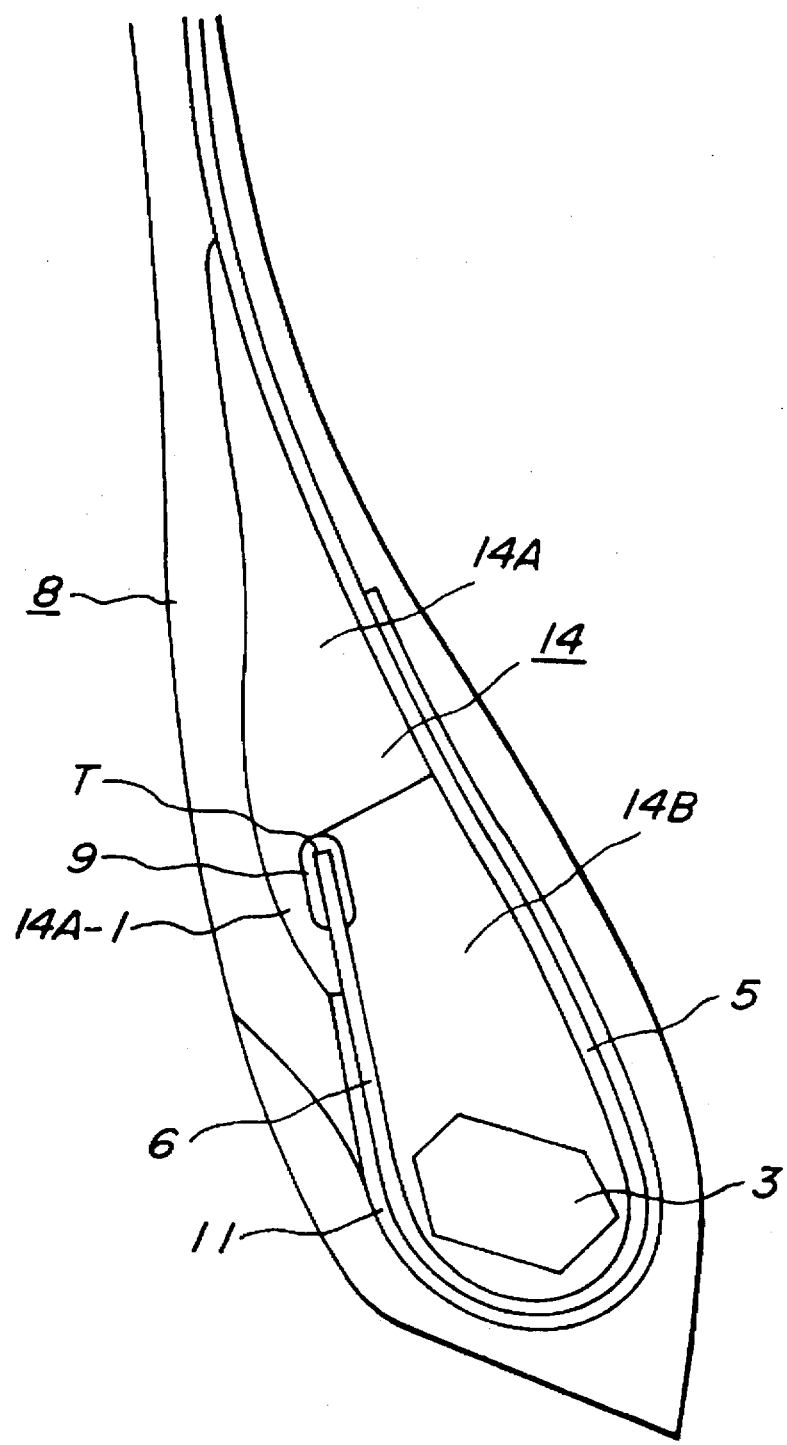
FIG. 14 is a diagrammatically section view of a thirteenth embodiment of the bead portion according to the invention.

In FIG. 14 is shown a diagrammatically enlarged section of a twelfth embodiment of the bead portion applied to the tire 1 according to the invention. This embodiment is a modification of the seventh embodiment shown in FIG. 9 in which the bead filler 14 consists of the rubber stock 14A having a Shore A hardness of 49° and the rubber stock 14B having a Shore A hardness of 63° instead of a three rubber stock structure.

In FIG. 15 is shown a diagrammatically enlarged section of a first conventional bead portion applied to the tire 1, which has the same structure as in the seventh embodiment except that the rubber stock 14A constituting the bead filler 14 does not have the rubber stock portion 14A-1 covering the outward surface of the turnup portion 6 in the axial direction.

In FIG. 16 is shown a diagrammatically enlarged section of a second conventional bead portion applied to the tire 1, which has the same structure as in the twelfth embodiment except that the rubber stock 14A constituting the bead filler 14 does not have the rubber stock portion 14A-1 covering the outward surface of the turnup portion 6 in the axial direction.

In FIG. 17 is shown a diagrammatically enlarged section of a third conventional bead portion applied to the tire 1, which has the same structure as in the first conventional bead portion except that the rubber stock 8B of the coating rubber 8 is made from the same rubber material as in the rubber stock 14A and has a Shore A hardness of 49°.

In order to confirm the effect according to the invention, tests for the durability of the bead portion and weather resistance (resistance to ozone cracking) were made with respect to the above tires of the seventh to twelfth embodiments together with the tires of the first to third conventional embodiments.

The durability of the bead portion is evaluated in the same manner as in the above first embodiment and represented by an index on the basis that the running distance of the conventional embodiment 1 is 100. The larger the index value, the better the durability of the bead portion.

In the measurement of the weather resistance, the test tire is inflated under an internal pressure of 8.0 kgf/cm$^2$, placed on a steel drum having a radius of 1.7 m under a load of 2725 kgf, and then run thereon at a speed of 45 km/h under an outdoor condition exposed to an ultraviolet ray over a distance of 100,000 km. The weather resistance is evaluated by an index on the basis that an average depth of ozone cracking produced in the sidewall portion near to the radially outward turnup end portion in the tire of the conventional embodiment 1 is 100. The larger the index value, the poorer the weather resistance.

The test results are shown in Table 3.

TABLE 3

|  | Running distance (index) | Crack depth (index) |
|---|---|---|
| Seventh embodiment | 125 | 103 |
| Eighth embodiment | 128 | 103 |
| Ninth embodiment | 125 | 103 |
| Tenth embodiment | 127 | 103 |
| Eleventh embodiment | 119 | 105 |
| Twelfth embodiment | 112 | 106 |
| Conventional embodiment 1 | 100 | 100 |
| Conventional embodiment 2 | 90 | 102 |
| Conventional embodiment 3 | 103 | 185 |

As mentioned above, according to the invention, the deformation-absorbing rubber layer is arranged along the outward surface of the turnup portion in the axial direction near to the outward turnup end portion in the radial direction of the tire, whereby the durability of the bead portion can be further improved as compared with the conventional tire without a deformation-absorbing rubber layer.

What is claimed is:

1. A heavy duty pneumatic radial tire comprising; a tread portion, a pair of sidewall portions extending inward from both side ends of the tread portion in a radial direction of the tire, a pair of bead portions extending inward from the sidewall portions and containing a pair of bead cores therein, at least one radial carcass ply extending between the bead cores and wound around each of the bead cores from inside of the tire toward the outside thereof to form a turnup portion and containing cords having a modulus of elasticity of not less than 2500 kg/mm$^2$ therein, a bead filler extending upward and taperingly from the bead core over an outward end of the turnup portion in the radial direction and comprised of at least two rubber stocks in which a lower part near to the bead core is a hard rubber stock and an upper part is a soft rubber stock, at least a part of an outer surface of the turnup portion in axial direction of the tire being covered with a deformation-absorbing rubber layer arranged along the soft rubber stock to extend outward over the outward end of the turnup portion in the radial direction and having a Shore A hardness of not more than 55°, and a length of the outer surface of the turnup portion covered with the deformation-absorbing rubber layer being 3 to 30 times a diameter of the cord included in the turnup portion.

2. A heavy duty pneumatic radial tire according to claim 1, wherein the deformation-absorbing rubber layer and the soft rubber stock are made from substantially the same rubber material.

3. A heavy duty pneumatic radial tire according to claim 1, wherein a maximum thickness of the deformation-absorbing rubber layer in the axial direction is 1 to 10 times the diameter of the cord included in the turnup portion.

4. A heavy duty pneumatic radial tire according to claim 1, wherein the Shore A hardness of the deformation-absorbing rubber layer is 38°–55° and the Shore A hardness of the hard rubber stock is not less than 58°.

5. A heavy duty pneumatic radial tire according to claim 1, wherein a ply end rubber similar to a coating rubber of the carcass ply is arranged on the outward end of the turnup portion so as to extend inward from the outward end along at least one side surface of the turnup portion in the radial direction.

6. A heavy duty pneumatic radial tire according to claim 1, wherein at least one cord chafer having a modulus of elasticity of not less than 2500 kg/mm$^2$ is arranged outside the turnup portion therealong as a bead portion reinforcing cord layer.

7. A heavy duty pneumatic radial tire comprising; a tread portion, a pair of sidewall portions extending inward from both side ends of the tread portion in a radial direction of the tire, a pair of bead portions extending inward from the sidewall portions and containing a pair of bead cores therein, at least one radial carcass ply extending between the bead cores and wound around each of the bead cores from inside of the tire toward the outside thereof to form a turnup portion and containing cords having a modulus of elasticity of not less than 2500 kg/mm$^2$ therein, a bead filler extending upward and taperingly from the bead core over an outward end of the turnup portion in the radial direction and comprised of at least two rubber stocks in which a lower part near to the bead core is a hard rubber stock and an upper part is a soft rubber stock, at least a part of an outer surface of the turnup portion in axial direction of the tire being covered with a deformation-absorbing rubber layer arranged along the soft rubber stock to extend outward over the outward end of the turnup portion in the radial direction and having a Shore A hardness of not more than 55°, and a maximum thickness of the deformation-absorbing rubber layer in the axial direction being 1 to 10 times the diameter of the cord included in the turnup portion.

8. A heavy duty pneumatic radial tire according to claim 7, wherein the deformation-absorbing rubber layer and the soft rubber stock are made from substantially the same rubber material.

9. A heavy duty pneumatic radial tire according to claim 7, wherein a length of the outer surface of the turnup portion covered with the deformation-absorbing rubber layer is 3 to 30 times a diameter of the cord included in the turnup portion.

10. A heavy duty pneumatic radial tire according to claim 7, wherein the Shore A hardness of the deformation-absorbing rubber layer is 38°–55° and the Shore A hardness of the hard rubber stock is not less than 58°.

11. A heavy duty pneumatic radial tire according to claim 7, wherein a ply end rubber similar to a coating rubber of the carcass ply is arranged on the outward end of the turnup portion so as to extend inward from the outward end along at least one side surface of the turnup portion in the radial direction.

12. A heavy duty pneumatic radial tire according to claim 7, wherein at least one cord chafer having a modulus of elasticity of not less than 2500 kg/mm$^2$ is arranged outside the turnup portion therealong as a bead portion reinforcing cord layer.

13. A heavy duty pneumatic radial tire comprising; a tread portion, a pair of sidewall portions extending inward from both side ends of the tread portion in a radial direction of the tire, a pair of bead portions extending inward from the sidewall portions and containing a pair of bead cores therein, at least one radial carcass ply extending between the bead cores and wound around each of the bead cores from inside of the tire toward the outside thereof to form a turnup portion and containing cords having a modulus of elasticity of not less than 2500 kg/mm$^2$ therein, a bead filler extending upward and taperingly from the bead core over an outward end of the turnup portion in the radial direction and comprised of at least two rubber stocks in which a lower part near to the bead core is a hard rubber stock and an upper part is a soft rubber stock, at least a part of an outer surface of the turnup portion in axial direction of the tire being covered with a deformation-absorbing rubber layer arranged along the soft rubber stock to extend outward over the outward end of the turnup portion in the radial direction and having a Shore A hardness of not more than 55°, and a ply end rubber similar to a coating rubber of the carcass ply being arranged on the outward end of the turnup portion so as to extend inward from the outward end along at least one side surface of the turnup portion in the radial direction.

14. A heavy duty pneumatic radial tire according to claim 13, wherein the deformation-absorbing rubber layer and the soft rubber stock are made from substantially the same rubber material.

15. A heavy duty pneumatic radial tire according to claim 13, wherein a length of the outer surface of the turnup portion covered with the deformation-absorbing rubber layer is 3 to 30 times a diameter of the cord included in the turnup portion.

16. A heavy duty pneumatic radial tire according to claim 13, wherein a maximum thickness of the deformation-absorbing rubber layer in the axial direction is 1 to 10 times the diameter of the cord included in the turnup portion.

17. A heavy duty pneumatic radial tire according to claim 13, wherein the Shore A hardness of the deformation-absorbing rubber layer is 38°–55° and the Shore A hardness of the hard rubber stock is not less than 58°.

18. A heavy duty pneumatic radial tire according to claim 13, wherein at least one cord chafer having a modulus of elasticity of not less than 2500 kg/mm$^2$ is arranged outside the turnup portion therealong as a bead portion reinforcing cord layer.

* * * * *